US010952566B2

(12) United States Patent
Guetta

(10) Patent No.: US 10,952,566 B2
(45) Date of Patent: *Mar. 23, 2021

(54) PERSONAL WEED GRINDER

(71) Applicant: Liran Guetta, Holon (IL)

(72) Inventor: Liran Guetta, Holon (IL)

(73) Assignee: Liran Guetta, Holon (IL)

( * ) Notice: Subject to any disclaimer, the term of this patent is extended or adjusted under 35 U.S.C. 154(b) by 196 days.

This patent is subject to a terminal disclaimer.

(21) Appl. No.: 16/163,603

(22) Filed: Oct. 18, 2018

(65) Prior Publication Data

US 2019/0174957 A1  Jun. 13, 2019

(30) Foreign Application Priority Data

Dec. 11, 2017 (IL) .......................................... 256287
Aug. 26, 2018 (IL) .......................................... 261378

(51) Int. Cl.
| | |
|---|---|
| A47J 42/34 | (2006.01) |
| A47J 43/25 | (2006.01) |
| A24F 23/02 | (2006.01) |
| A24F 15/18 | (2006.01) |
| B02C 18/04 | (2006.01) |
| A47J 42/14 | (2006.01) |

(52) U.S. Cl.
CPC ............... *A47J 42/34* (2013.01); *A24F 15/18* (2013.01); *A24F 23/02* (2013.01); *A47J 42/14* (2013.01); *A47J 43/25* (2013.01); *B02C 18/04* (2013.01)

(58) Field of Classification Search
CPC ........... A47J 43/25; A24F 23/02; A24F 15/18; B02C 18/04

USPC ................................ 241/168–169.2; 131/311
See application file for complete search history.

(56) References Cited

U.S. PATENT DOCUMENTS

| | | | | |
|---|---|---|---|---|
| 854,384 | A | | 5/1907 | Ross |
| 982,292 | A | * | 1/1911 | Barnwell ................. A24F 23/04 206/237 |
| 1,156,720 | A | * | 10/1915 | Stromeyer .............. A24F 23/04 206/237 |
| 2,453,777 | A | * | 11/1948 | Bell ........................ A24F 15/18 221/32 |
| 3,734,003 | A | * | 5/1973 | Gerson .................... A47J 17/02 99/588 |
| 4,886,161 | A | * | 12/1989 | Keidar .................... A24F 15/18 206/246 |

(Continued)

FOREIGN PATENT DOCUMENTS

JP          3468617 B2     11/2003

*Primary Examiner* — Faye Francis
(74) *Attorney, Agent, or Firm* — Soroker Agmon Nordman

(57) ABSTRACT

A pocket sized weed grinder is provided herein. The weed grinder includes a single board, including at least four panels, at least one folding line disposed between adjacent panels of the at least four panels, for forming a closed flat cell between two of the adjacent panels, and two grinding plates, each grinding plate disposed on each of two of the adjacent panels. At least one of the two grinding plates is movable in linear motion with respect to the other. The weed grinder enables grinding of weed, accumulating the ground weed within the weed grinder and pouring the ground weed to a smoking paper, while avoiding the need of a mediator element to which ground weed is poured and from which ground weed is poured into a smoking paper, as in currently used weed grinders.

16 Claims, 14 Drawing Sheets

(56) References Cited

U.S. PATENT DOCUMENTS

| | | | | |
|---|---|---|---|---|
| 5,752,589 | A * | 5/1998 | Berg | B42F 7/02 |
| | | | | 190/109 |
| 5,878,875 | A * | 3/1999 | Leong | A24F 15/18 |
| | | | | 206/268 |
| 6,164,443 | A * | 12/2000 | Mitchell | A24C 5/40 |
| | | | | 131/347 |
| 6,557,178 | B1 * | 5/2003 | Hoover | A41D 19/01594 |
| | | | | 15/227 |
| 7,020,898 | B1 * | 4/2006 | Pucci | A47L 13/18 |
| | | | | 2/161.6 |
| 7,455,176 | B2 * | 11/2008 | Focke | B65D 85/1045 |
| | | | | 206/268 |
| 9,072,320 | B2 * | 7/2015 | Coatney | A24F 15/18 |
| 2006/0211352 | A1 * | 9/2006 | Adams | B24D 15/00 |
| | | | | 451/523 |
| 2011/0030710 | A1 * | 2/2011 | Kesselman | A24F 17/00 |
| | | | | 131/365 |
| 2016/0302620 | A1 * | 10/2016 | Repac | B26D 3/185 |
| 2017/0006913 | A1 * | 1/2017 | Little | B65D 33/18 |
| 2017/0215494 | A1 * | 8/2017 | Savides | A47J 17/10 |
| 2018/0049595 | A1 * | 2/2018 | Leibovitch | A47J 43/25 |
| 2019/0142192 | A1 * | 5/2019 | Rampersd | A47J 43/283 |
| | | | | 294/99.2 |
| 2019/0183165 | A1 * | 6/2019 | Haddad | A24F 15/00 |
| 2020/0113229 | A1 * | 4/2020 | Barry | A24F 15/18 |

* cited by examiner

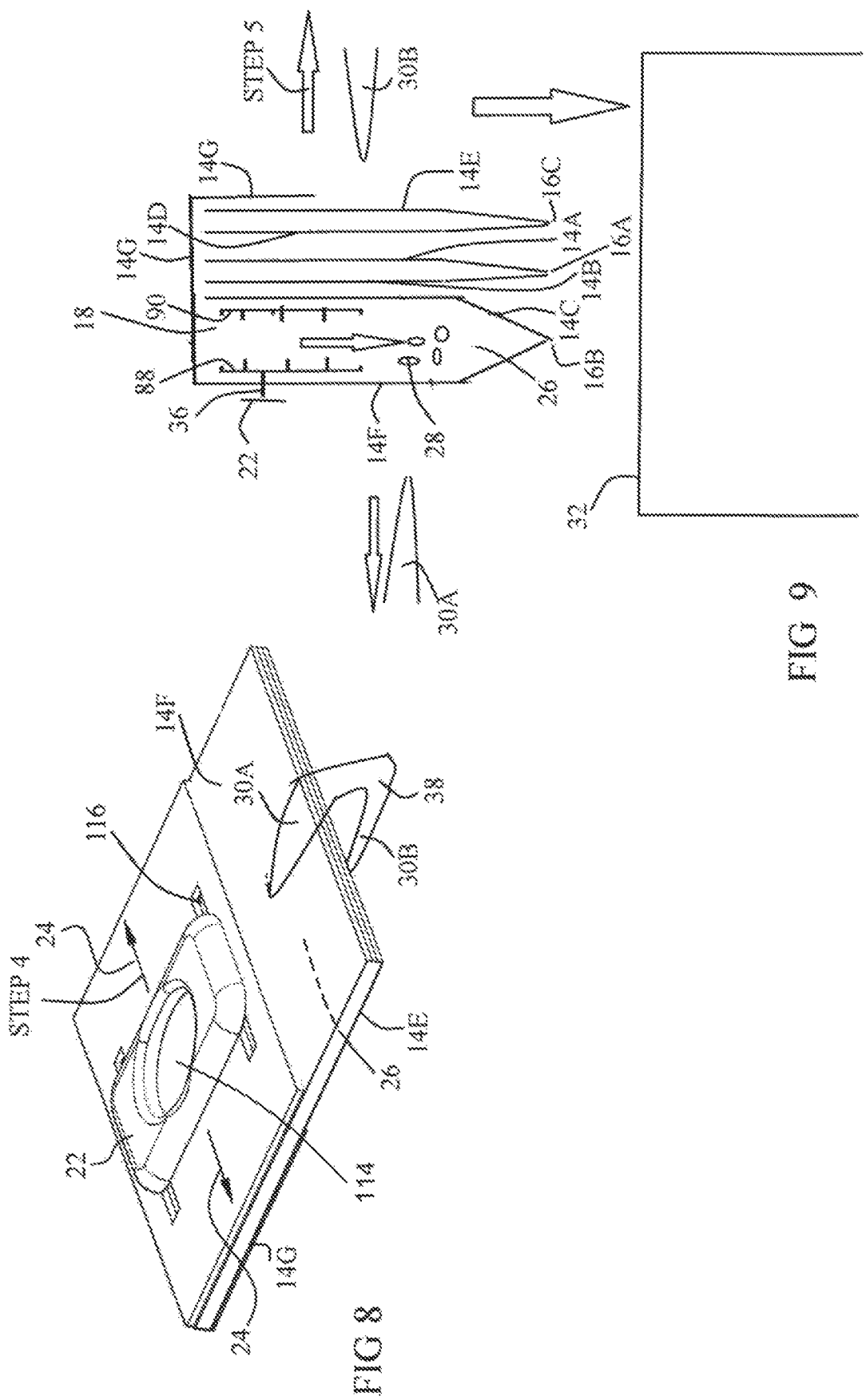

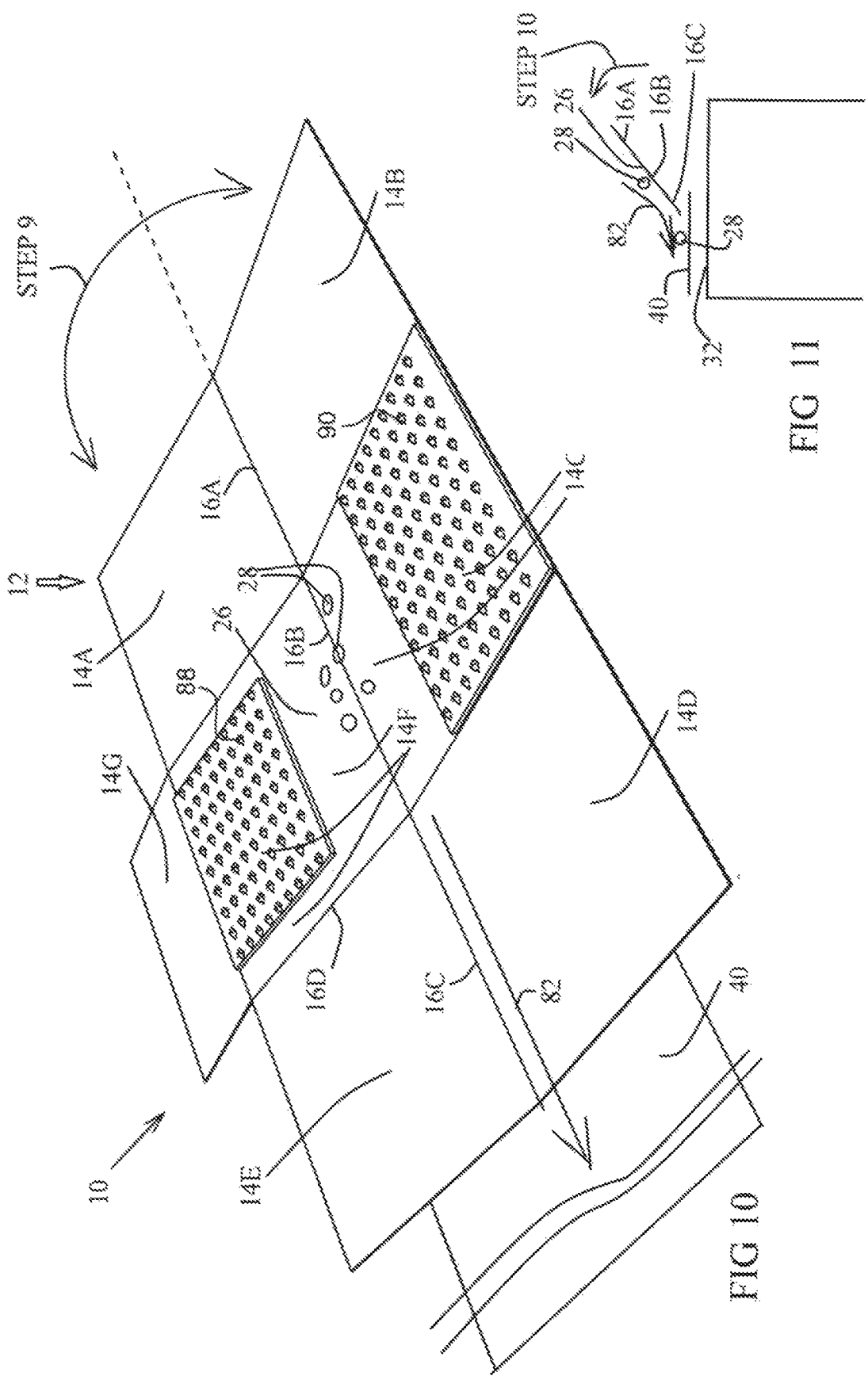

US 10,952,566 B2

PERSONAL WEED GRINDER

TECHNICAL FIELD

The present disclosure generally relates to the field of personal weed grinders.

BACKGROUND

Personal weed grinders, used typically for smokers, are disadvantaged of being large, rather than being fitted to the pocket.

The term "smoking paper" refers to a paper for being filled with ground weed, and for then being rolled, thereby producing a cigarette.

Further, the picking of the ground weed from the weed grinder into the smoking paper, is not convenient. Currently used personal weed grinders require the use of a 'mediator' element, e.g., paper, which the ground weed is to be placed onto, and from which the ground weed is to be collected into the smoking paper.

There is a long felt need to provide a solution to the above-mentioned and other problems of the prior art.

SUMMARY

There is thus provided, in accordance with some embodiments of the disclosure, a weed grinder, comprising: a single board, comprising at least four panels, at least one folding line disposed between adjacent panels of the at least four panels, for forming a closed flat cell between two of the adjacent panels, and two grinding plates, each grinding plate disposed on each of the two of the adjacent panels. At least one of the two grinding plates may be movable in linear motion with respect to the other.

According to some embodiments, the size of the weed grinder in folded state may conform to a pocket size.

In some embodiments, the weed grinder may be configured to allow to dispose weed on the single board, to form the closed flat cell for grinding the weed, and then to partly deploy the single board for directing pouring of the weed once being ground, out of the single board by gravity, through the at least one folding line, such to avoid use of, a mediator element.

In some embodiments, each of the two grinding plates may be smaller than the panel on which each of the two grinding plates is disposed, and each of the two grinding plates may be disposed away from the folding line disposed between the two adjacent panels, thereby forming a non-grindable area on the two adjacent panels between the two grinding plates, from which the ground weed may be pourable out of the single board.

In some embodiments, the at least one moveable grinding plate may move along a smooth surface attached onto at least, one of the at least two adjacent panels.

In some embodiments, the weed grinder may further comprise a handle being accessible from outside the flat cell. The handle may be configured to move the at least one movable grinding plate in linear motion. In some embodiments, the handle may be configured to move back and forth along a track.

According to some embodiments, the weed grinder may further comprise at least one lateral track located along a lateral axis of the weed grinder, and at least one longitudinal track located along a longitudinal axis of the weed grinder. The handle may be configured to move in linear motion along the at least one lateral track and may be configured to move in linear motion along the at least one longitudinal track.

In some embodiments, each of the two grinding plates may comprise protruding elements. The protruding elements may be evenly spaced and located along the lateral and longitudinal axes of each of the two grinding plates.

In some embodiments, the single board may be made of a non-absorbent material. The non-absorbent material may be paper covered with aluminum foil.

In some embodiments, the weed grinder may be configured to preserve weed within the weed grinder, before and/or after grinding.

In some embodiments, the weed grinder may be configured to rub weed between the two grinding plates, and not crush the weed as do currently used weed grinders.

In some embodiments, the weed grinder may comprise at least two connecting means that cause the weed grinder to stay in folded state. The at least two connecting means may be selected from a group consisting of: a magnet, an element made of a material that is attracted to magnets, a snap, a press stud and any combination thereof.

BRIEF DESCRIPTION OF THE DRAWINGS

Embodiments, features, and aspects of the invention are described herein in conjunction with the following drawings:

FIG. 8 is a perspective view of the folded state of FIG. 5, including the fourth step of use;

FIG. 9 is a side sectional view of the folded state of FIG. 5 at the fifth step of use;

FIG. 10 is a perspective view of the ninth step of use;

FIG. 11 is a front non-perspective view of the non-folded state of 1, for describing the tenth step of use;

The drawings are not necessarily drawn to scale.

DETAILED DESCRIPTION

The invention will be understood from the following detailed description of embodiments of the disclosure, which are meant to be descriptive and not limiting. For the sake of brevity, some well-known features are not described in detail.

The reference numbers have been used to point out elements in the embodiments described and illustrated herein, in order to facilitate the understanding of the disclosure. They are meant to be merely illustrative, and not limiting. Also, the foregoing embodiments of the disclosure have been described and illustrated in conjunction with systems and methods thereof, which are meant to be merely illustrative, and not limiting.

Figure 1:
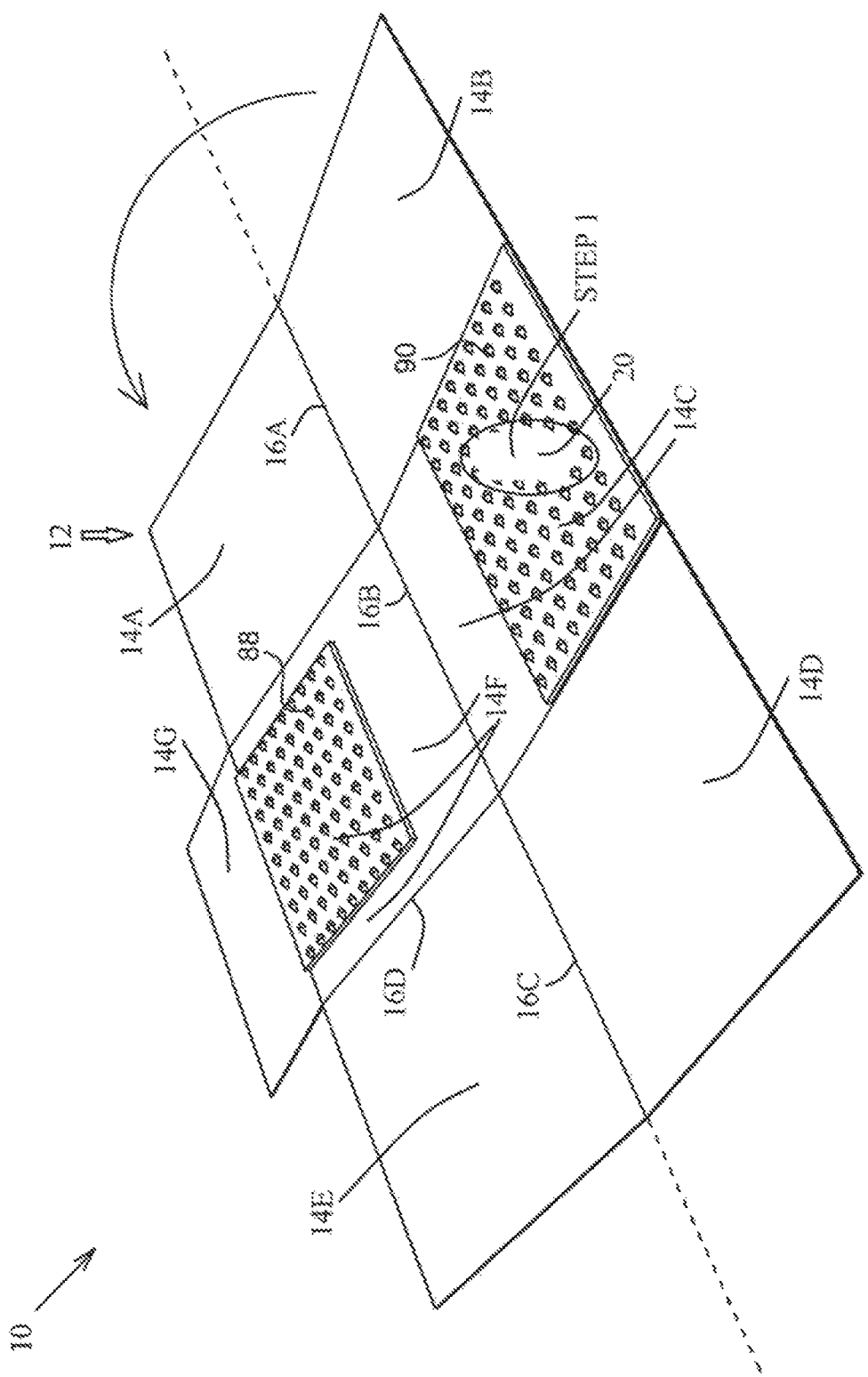
FIG. 1 depicts a weed grinder according to one embodiment of the disclosure, and the first step of use.

FIG. 1 depicts a weed grinder according to one embodiment of the disclosure, and the first step of use. A weed grinder 10 according to one embodiment of the disclosure, constitutes a single board 12, including a plurality of panels 14A, 14B, etc. and folding lines 16A between the panels, for allowing forming a closed flat cell 18 by the panels.

For example, flat cell 18 upon being formed by two panels 14C and 14F must be closed from four sides. The first side is closed by the connection of folding line 16B therebetween; the other three sides may be closed by three adjacent panels 14E, 14G and 14A. Thus, the minimal structure may include five panels. In other embodiments, weed grinder 10 may comprise four panels, e.g., panels 14C, 14F, 14E and 14A and the user may hold weed grinder 10 such that the opening that would have been covered by folding panel 14G, is positioned upright. That is, by holding weed grinder 10 in an upright position, panel 14G is not required to be part of weed grinder 10. Therefore, in some embodiments, the minimal structure of weed grinder 10 may comprise four panels.

Weed grinder 10 further includes a movable grinding plate 88, which may be disposed on a panel 14F, and is movable in relation thereto, as shown by an arrow 24; and a stationary grinding plate 90, which may be disposed on panel 14C.

Movable grinding plate 88 is smaller than panel 14F and disposed away from folding line 166; and stationary grinding plate 90 is smaller than panel 14C and disposed away from folding line 16B; thus leaving a non-grindable area 26 disposed between movable grinding plate 88 and stationary grinding plate 90.

At the first step, the user places a weed 20 on movable grinding plate 88 or on stationary grinding plate 90.

At the second step, the user folds board 12. FIG. 2, FIG. 3, FIG. 4, and FIG. 5 describe the subsidiary steps of the second step.

Figure 2:
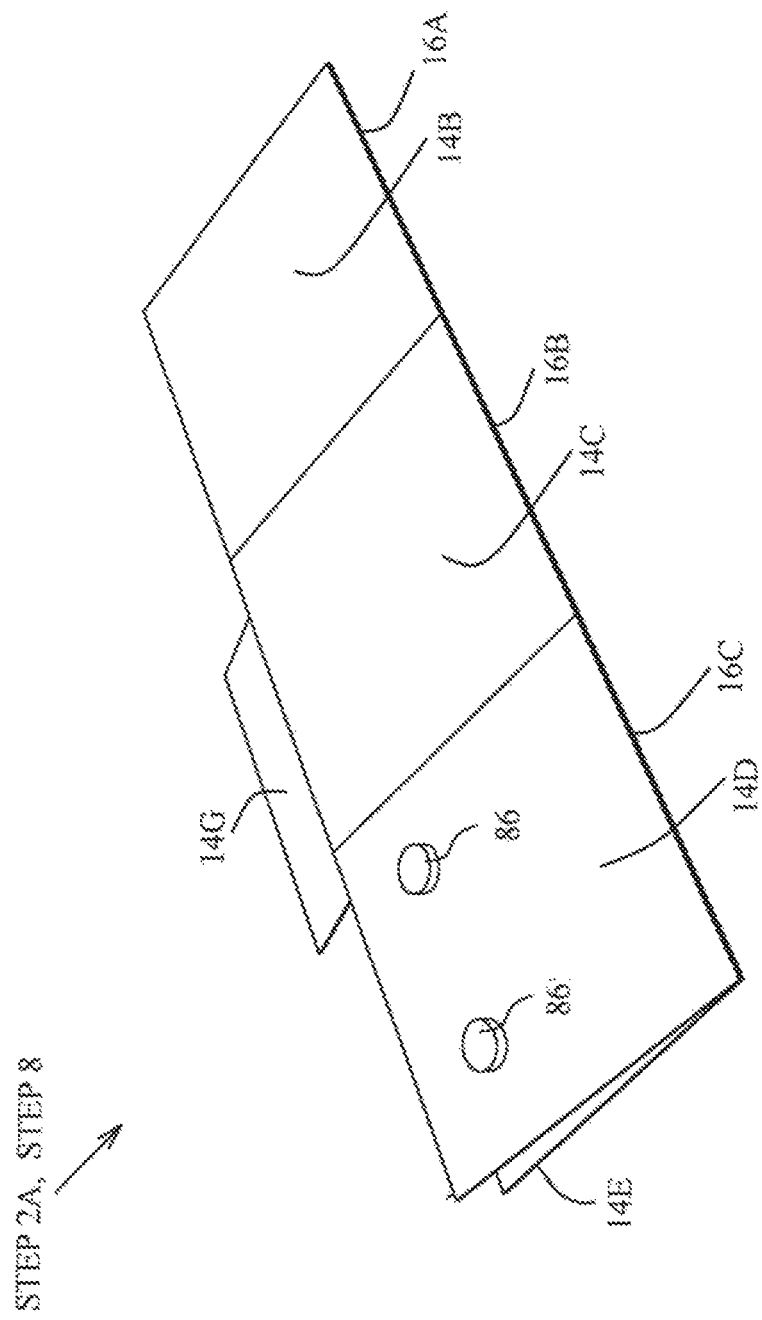
FIG. 2, FIG. 3, FIG. 4, and FIG. 5 describe the subsidiary steps of the second step.
Figure 3:
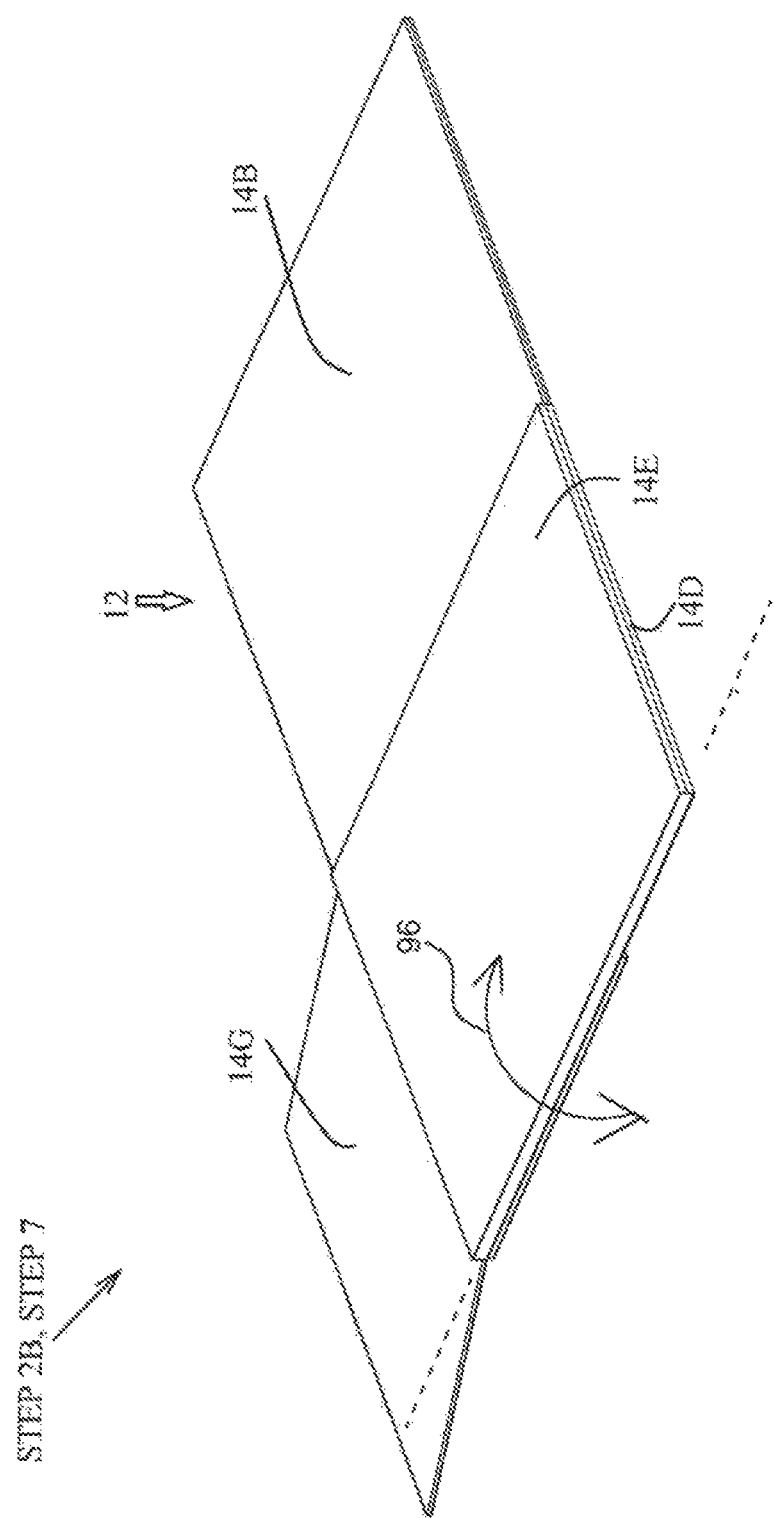
Figure 4:
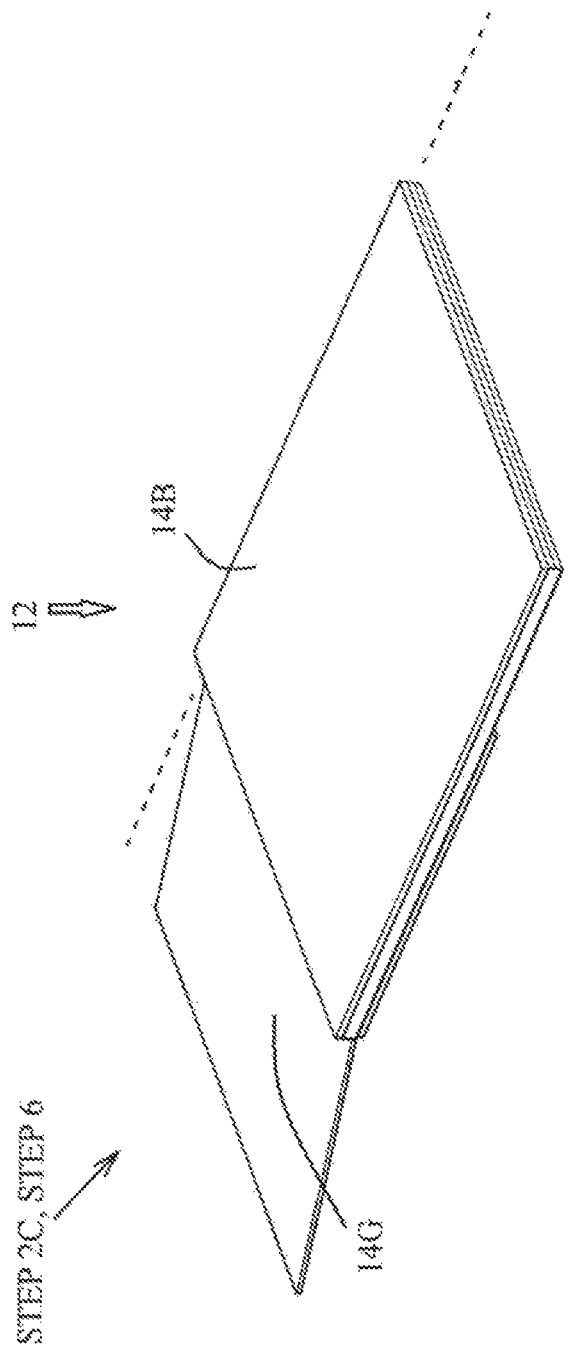
Figure 5:
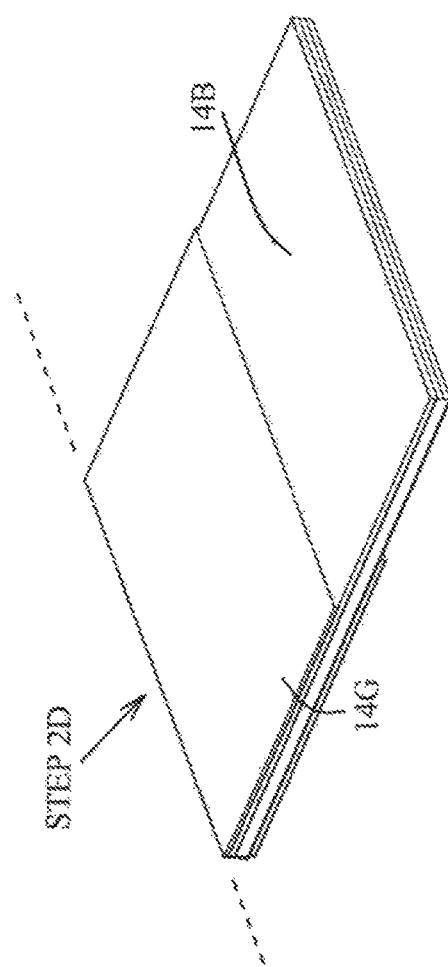

The second step may apply step 2A of FIG. 2, step 2B of FIG. 3, step 2C of FIG. 4, and step 2D of FIG. 5.

Figure 6:
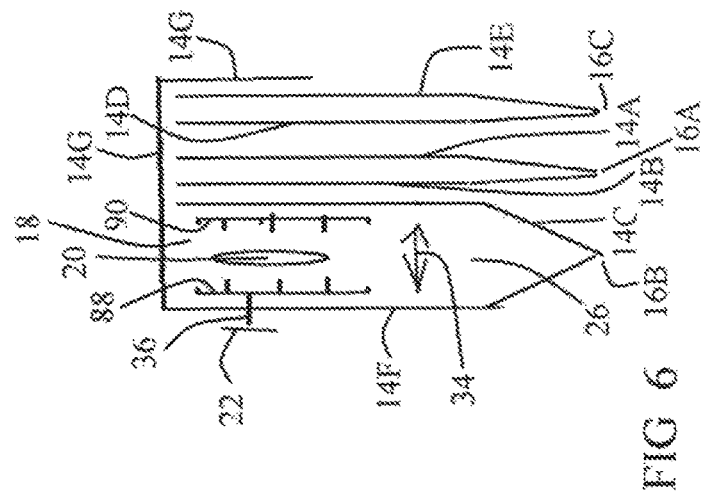
FIG. 6 is a side sectional view of the folded state of FIG. 5, and the third step of use.

FIG. 6 is a side sectional view of the folded state of FIG. 5, and the third step of use. At the folded state of FIG. 5, a closed cell 18, containing weed 20, is formed between panels 14C and 14F, which may be utilized for storing weed 20. Further, at the folded state of FIG. 5, weed 20 is confined between movable grinding plate 88 and stationary grinding plate 90.

However, the folding alone of the panels 14A, 14B, etc. does not provide any pressure of movable grinding plate 88 and a stationary grinding plate 90 one towards the other, required for the grinding. Rather, the width 34 of closed cell 18 is advantaged in being changeable, for allowing packaging and grinding a non-determined amount of weed 20.

Figure 7:
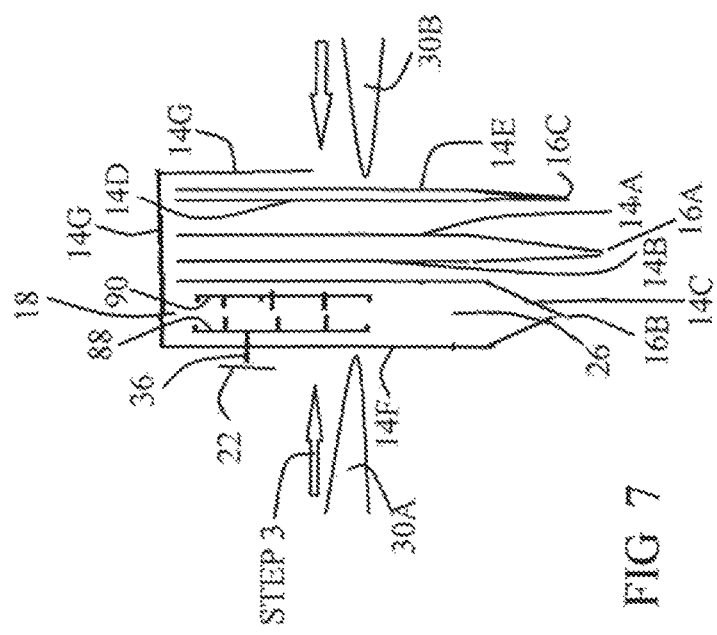
FIG. 7 is similar to FIG. 6, except for adding the third step of use.

FIG. 7 is similar to FIG. 6, except for adding the third step of use. The solution is applied at the third step, in which the user presses the external panels, 14E and 14F one towards the other, thereby pressing movable grinding plate 88 and a stationary grinding plate 90 one towards the other. Panel 14F is disposed externally in relation to the others, and thus an external handle 22, crossing panel 14F by a rod 36, is fixed to movable grinding plate 88.

FIG. 8 is a perspective view of the folded state of FIG. 5, including the fourth step of use. At the fourth step, being while fingers 30A and 30B press the external panels, the user moves handle 22, crossing panel 14F, for moving grinding plate 88 in relation to panel 14F, as shown by arrow 24.

FIG. 9 is a side sectional view of the folded state of FIG. 5 at the fifth step of use. At the fifth step, the user ceases the pressing by fingers 30A and 30B, while non-grinding area 26 is disposed at the bottom. The user may further knock weed grinder 10 downwards onto a table 32, for making the ground weed fall towards non-grinding area 26.

Referring again to FIG. 4, at the sixth step, the user unfolds board 12 to the state of FIG. 4.

Referring again to FIG. 3, at the seventh step, the user unfolds board 12 to the state of FIG. 3.

Referring again to FIG. 2, at the eighth step, the user unfolds board 12 to the state of FIG. 2, while folding lines 16A, 16B and 16C are disposed lowest.

FIG. 10 is a perspective view of the ninth step of use. At the ninth step, the user further unfolds board 12 above or near a smoking paper 40. The falling of ground weeds 28 by gravity into non-grindable area 26 is now exposed. Preferably, the user maintains the fold slightly folded.

FIG. 11 is a front non-perspective view of the non-folded state of 1, for describing the tenth step of use. At the tenth step, the user tilts board 12 for bringing folding line 16B to be disposed higher than folding line 16C (or 16A), thus pouring ground weed 28 from non-grindable area 26, being above folding line 16B, through folding line 16C out of board 12 in a controllable manner, as shown by arrow 82, which may be accurately straight into smoking paper 40, since it is being directed by folding lines 16B and 16C.

Thus, in one aspect, the invention is directed to a weed grinder (10), including:
- a single board (12), including at least five panels (14C, 14F,14A,14E,14G);
- at least one folding line (16B) disposed between adjacent panels (14C, 14F) of the at least five panels (14C,14F, 14A,14E,14G), for allowing forming a closed flat cell (18) between two (14C, 14F) of the adjacent panels; and
- a grinding plate (88,90) disposed on each of the two (14C, 14F) of the adjacent panels, wherein at least one (88) of the grinding plates (88,90) is movable (24).

The weed grinder (10) provides reducing the width of the weed grinder (10) being a width of the at least five panels (14C,14F,14A,14E,14G) plus the width of the grinding plates (88,90).

The weed grinder (10) provides allowing to dispose a weed (20) on the single board (12) while being deployed, then to form the closed flat cell (18) for grinding the weed (20), and then to partly deploy the single board (12) for directing pouring (82) of the weed (20) once being ground (28), out of the single board (12) by gravity, through the at least one folding line (16B).

Each of the grinding plates (88,90) preferably is smaller than the panel (14C, 14F) on which it is disposed, and is disposed away from the folding line (16B) disposed between the two (14C, 14F) of the adjacent panels, thereby forming a non-grindable area (26) on the two (14C, 14F) adjacent panels between the grinding plates (88,90), from which the ground weed (28) is pourable (82) out of the single board (12).

The folding for the forming of the closed flat cell (18) applies disposing one of the two (14C, 14F) of the adjacent panels externally, in relation to the other panels, and wherein the weed grinder (10) further includes:

a handle (22), being accessible from outside the flat cell (18) for moving (24) the movable grinding plate (88).

The movability (24) of the movable grinding plate (88) preferably is parallel to the folding line (16B) disposed between the two (14C, 14F) adjacent panels, thereby forming a non-grindable area (26) on the two (14C, 14F) adjacent panels between the grinding plates (88,90), from which the ground weed (28) is pourable (82) out of the single board (12).

The at least five panels (14C,14F,14A,14E,14G) and the folding lines form a width (34) of the closed flat cell (18) being changeable, thereby user-operable external pressure (30A,30B) enables the grinding, and user-operable release of the pressure allows dropping ground weeds (28) to fall by gravity into a non-grindable area (26) of the closed flat cell (18).

In the figures and/or description herein, the following reference numerals (Reference Signs List) have been mentioned:

numeral 10 denotes the weed grinder according to one embodiment of the disclosure;
numeral 12 denotes the board, being typically of coated carton, or of another material;
numerals 14A, 14B, 14C, 140, 14E, 14F, and 14G denote panels, being connected one to the other by folding lines;
numerals 16A, 16B, 16C and 16D denote folding lines between adjacent panels;
numeral 18 denotes the flat closed cell;
numeral 20 denotes the weed, being placed at the first step;
numeral 22 denotes the handle;
numeral 26 denotes the non-grinding area;
numeral 28 denotes the ground weed, being exposed at the ninth step at the non-grinding area;
numerals 30A and 30B denote fingers;
numeral 34 denotes the changeable width of the flat closed cell; this width is negligible, in relation to sizes of the panels;
numeral 36 denotes a rod threaded through panel 14F;
numeral 38 denotes the user's hand;
numeral 40 denotes a smoking paper;
numeral 82 denotes pouring upon tilting the board, preferably while folding lines 16A, 16B and 16C are partly folded;
numeral 86 denotes a magnet attached to one panel, being 140 in the example, or a ferromagnetic material, for attaching to another panel, being 14G in the example;
numerals 88 and 90 denote the grinding plates;
numeral 96 denotes a folding or unfolding operation;
numeral 114 denotes a depression, for accompanying moving the handle; and
numeral 116 denotes a track, for sliding the handle and the movable grinding plate 88 therealong;

The foregoing description and illustrations of the embodiments of the disclosure have been presented for the purpose of illustration, and are not intended to be exhaustive or to limit the disclosure to the above description in any form.

Figure 12:
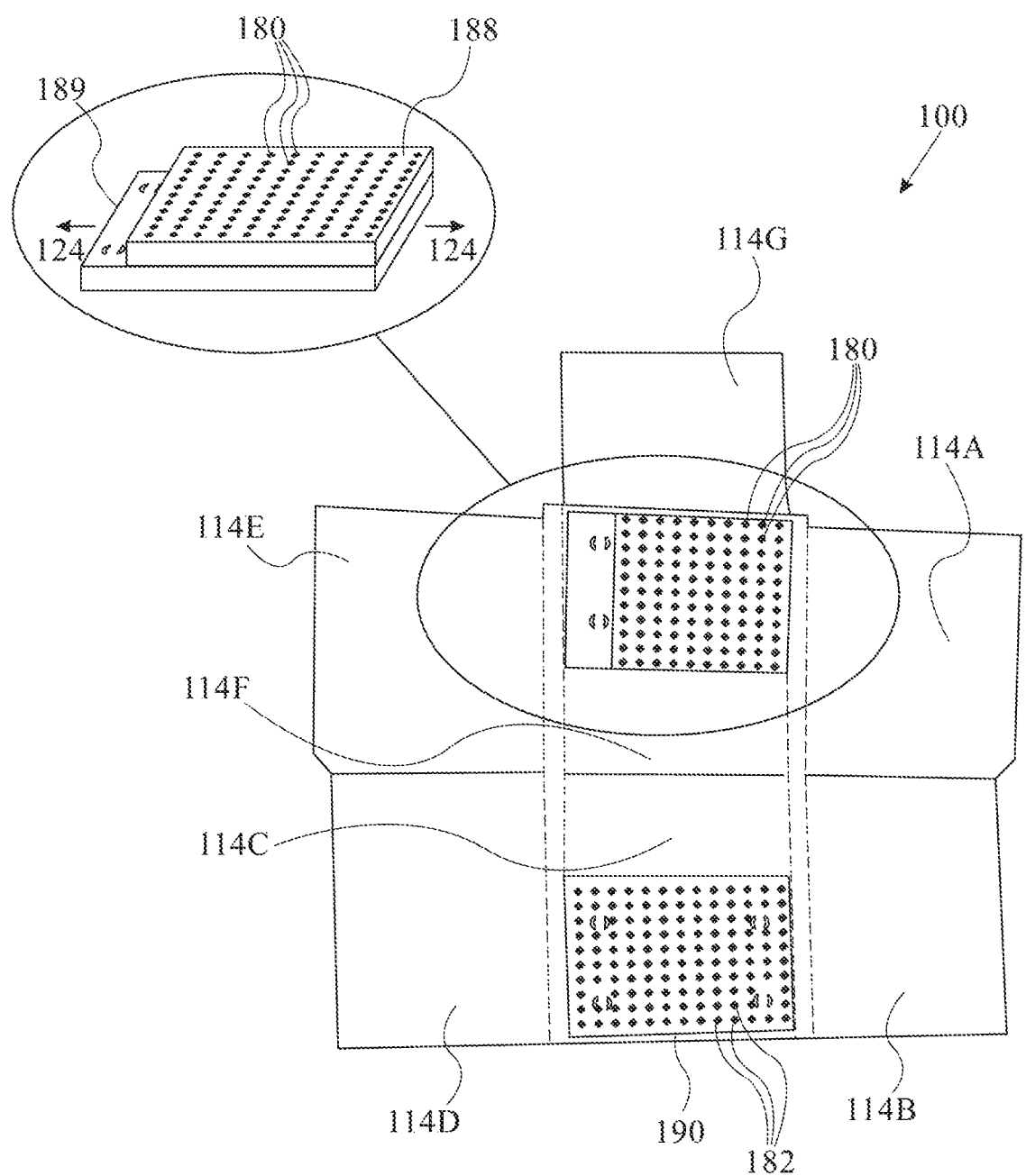
FIG. 12 is a schematic illustration of an upper view of a weed grinder in an un-folded state, in accordance with embodiments of the present disclosure.

Reference is now made to FIG. 12, which is a schematic illustration of an upper view of a weed grinder in an un-folded state, in accordance with embodiments of the present disclosure. According to some embodiments, weed grinder 100 may comprise several panels, e.g., panels 114A-114G, which when folded create a compact, e.g., pocket size, personal weed grinder. According to some embodiments, personal weed grinder 100 may comprise a first grinding plate 190, which may be attached onto one panel, e.g., panel 114C, and a second grinding plate 188, which may be attached onto another panel, e.g, panel 114F. In some embodiments, grinding plate 190 may be stationary, whereas grinding plate 188 may be moveable with respect to grinding plate 190, thus enabling the grinding process of weed placed between grinding plate 190 and grinding plate 188. In other embodiments, it may be such that grinding plate 190 is moveable with respect to stationary grinding plate 188. The location of the moving grinding plate and of the stationary grinding plate is irrelevant to the operation of weed grinder 100, as long, as these two corresponding grinding plates are located such that when weed grinder 100 is folded, these two grinding plates are in contact and one may be moved with respect to the other.

In some embodiments, grinding plate 188 may comprise a plurality of relatively small protruding elements 180, and grinding plate 190 may comprise a plurality of relatively small protruding elements 182. Protruding elements 180 and 182 may comprise sharp edges, e.g., spikes. In other embodiments, protruding elements 180 and 182 may not comprise sharp edges but due to their small size and large number attached onto grinding plate 188 and onto grinding plate 190, respectively, protruding elements 180 and 182 may rub against the substance inserted in between grinding plates 188 and 190. Protruding elements 180 and 182 may rub against the substance inserted between grinding plates 188 and 190 and thus create finely ground substance, which may be, for example, weed or tobacco. The small size, protruding shape and large number of protruding elements 180 and 182 may enable the substance inserted between grinding plates 188 and 190 to be rubbed against the protruding elements 180 and 182, respectively, and thus cause the inserted substance to be ground into small particles, which are much smaller and much finer compared to ground substance by current grinders, which merely crush the substance.

In some embodiments, grinding plate 188 may be moveable along smooth surface 189, such that surface 189 is connected to one of the panels of weed grinder 100, e.g., panel 114F, and grinding plate 188 may be attached to surface 189 while being able to easily and smoothly move with respect to surface 189. According to some embodiments, when moveable grinding plate 188 is moved by a user of weed grinder 100, with respect to grinding plate 190, any type of substance, e.g., weed or tobacco, may be finely ground by protruding elements 180 and 182 that are present on grinding plate 188 and on grinding plate 190, respectively. That is, grinding plate 188 may comprise protruding elements 180, and grinding plate 190 may comprise corresponding protruding elements 182. Protruding elements 180 may be evenly spaced along a longitudinal axis as well as along a lateral axis of grinding plate 188, same as protruding elements 182 are evenly spaced along the area of grinding plate 190. In some embodiments, protruding elements 180 may be arranged along several rows (lateral axis) and several columns (longitudinal axis), evenly spaced, along the surface area of grinding plate 188. Similarly, protruding elements 182 may be arranged along several rows (lateral axis) and columns (longitudinal axis), evenly spaced, along the surface area of grinding plate 190.

According to some embodiments, once grinding place 188 is folded over grinding plate 190, each protruding element 180 of grinding plate 188 may be positioned in the space created between a pair of adjacent protruding elements 182 of grinding plate 190, and vice versa. Thus, when a user moves, grinding plate 188 with respect to grinding plate 190, substance that is inserted in between grinding plates 188 and 190 is caught between protruding elements 180 and protruding elements 182, is rubbed between them and is then finely ground.

In some embodiments, the user of weed grinder 100 may control the degree of grinding; when a finely ground weed is required, a user may move grinding plate 188 over grinding plate 190 for a longer period of time compared to when weed is not required to be ground to thin pieces.

In some embodiments, weed grinder 100 may enable accumulation of ground substance, e.g., weed, within weed grinder 100, e.g., between panel 14F and panel 14C, for example along folding line 16B that is located between panels 14F and 14C. The fact that ground substance, such as weed, may be accumulated along folding line 168 (between two flat panels 14F and 14C), may enable a user of weed grinder 100 to insert the ground substance into a smoking paper directly from weed grinder 100, without the need for a mediator element, as required in current weed grinders. Since the ground substance is accumulated along a folding line between two flat panels, once the grinding process is complete, the ground substance may be easily poured directly from weed grinder 100 into any type of smoking paper.

Usually, a mediator element, e.g., mediator paper is used such that ground substance is poured into it and the mediator paper is then used for inserting the ground substance into a smoking paper. The mediator element is typically a piece of paper that is folded such that the ground substance is poured onto the mediator from current weed grinders, and the fold along the mediator enables easy and relatively highly accurate pouring of the ground substance into any type of smoking paper. This is since the ground substance may slide from and along the fold of the mediator into the smoking paper. Since weed grinder 100 comprises a folding line 16B along which the ground substance accumulates, weed grinder 100 acts both as a grinder as well as a mediator configured to pour the ground substance into a smoking paper. Therefore, weed grinder 100 makes use of a mediator paper redundant, e.g., use of weed grinder 100 avoids use of a mediator element, since the grinding process and the insertion of the ground substance into smoking paper may be done directly from weed grinder 100 itself.

In some embodiments, the panels of weed grinder 100 may be made of paper, aluminum foil, paper covered with aluminum foil, or any other material that is flexible enough to allow folding of the panels of weed grinder 100. According to some embodiments, in case the panels of weed grinder 100 are made from a material that is non-absorbent, e.g., that the material does not absorb water, the substance to be grinded by weed grinder 100, may be kept inside weed grinder 100 for a long period. For example, the panels may be made from paper covered with aluminum foil, either on both sides, or at least on the inner side that comes in contact with the substance. In case weed grinder 100 is made of a non-absorbent material, the substance inserted into weed grinder 100 may be preserved, e.g., maintain its properties, and stay intact for a long period of time, until the user decides to operate weed grinder 100 such to grind the substance kept within. In some embodiments, the properties of the substance kept within weed grinder 100 may be similar to those of a fresh substance.

According to some embodiments, grinding plate 188 is moved with respect to grinding plate 190 back and forth along the direction of arrows 124. In some embodiments, grinding plate 188 may move along a lateral axis illustrated by arrows 124. In another embodiment, grinding plate 188 may move along a longitudinal axis (not shown), while in other embodiments, grinding plate 188 may move along both a lateral axis and a longitudinal axis, as will be described in detail with respect to FIG. 23. In any case, it should be noted that grinding plate 188 may move against grinding plate 190 in a linear motion, and not in a circular motion as do current weed grinders.

Figure 13:
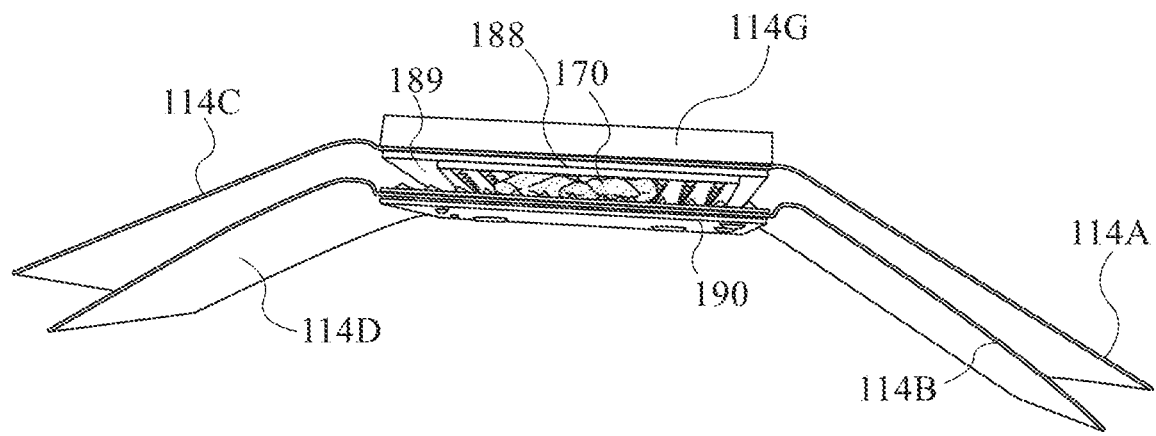
FIG. 13 is a schematic illustration of a weed grinder in a semi-folded state including weed, in accordance with embodiments of the present disclosure.

Reference is now made to FIG. 13, which is a schematic illustration of a weed grinder in a semi-folded state including weed, in accordance with embodiments of the present disclosure. According to FIG. 13, after folding weed grinder 100 substantially in half, weed 170 or any other substance may be inserted between grinding plate 188 and grinding plate 190. Then, panels 114D and 114E may be folded over the grinding plates, and panels 114A and 114B may be folded over the pair of panels 114D and 114E. On top of this stack of panels, panel 114G may be folded, such that the at least one magnetic element 174 (FIG. 16) may connect with the at least one magnetic element 176 (FIG. 16), which may be positioned onto corresponding panel 114C or any other panel that may be folded in close proximity to panel 114G.

Figure 14:
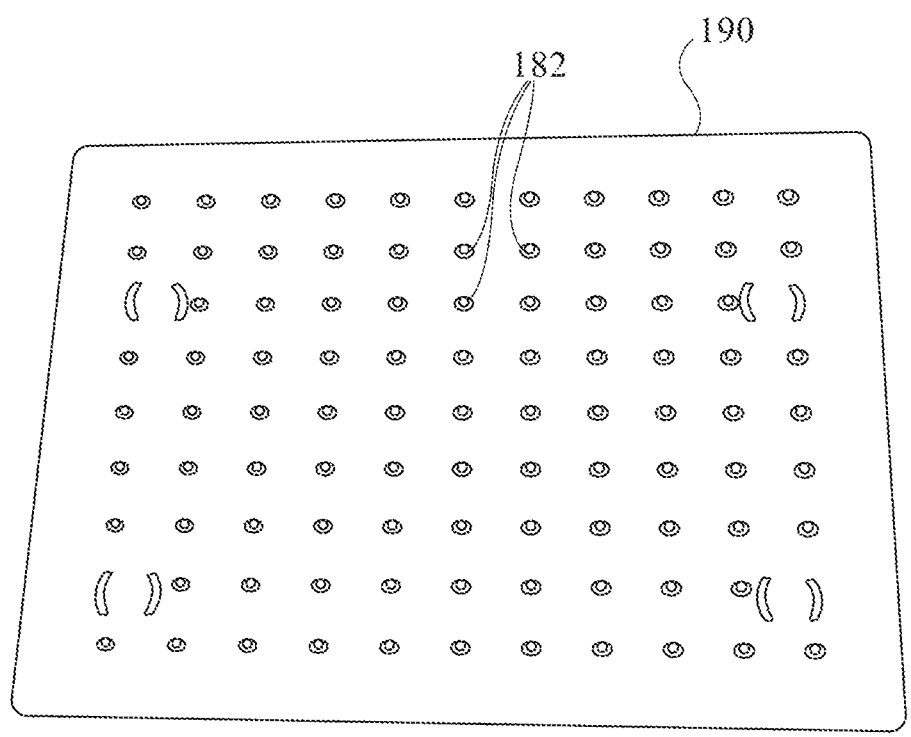
FIG. 14 is a schematic illustration of a front side of a stationary grinding plate, in accordance with embodiments of the present disclosure.

Reference is now made to FIG. 14, which is a schematic illustration of a front side of a stationary grinding plate, in accordance with embodiments of the present disclosure. According to some embodiments, a stationary grinding plate may be grinding plate 190. In some embodiments, grinding plate 190 may comprise protruding elements 182. According to some embodiments, protruding elements 182 may be located substantially along the entire area of grinding plate 190. Protruding elements 182 may be evenly spaced from one another, both along the lateral axis as well as along the longitudinal axis of grinding plate 190.

Figure 15:
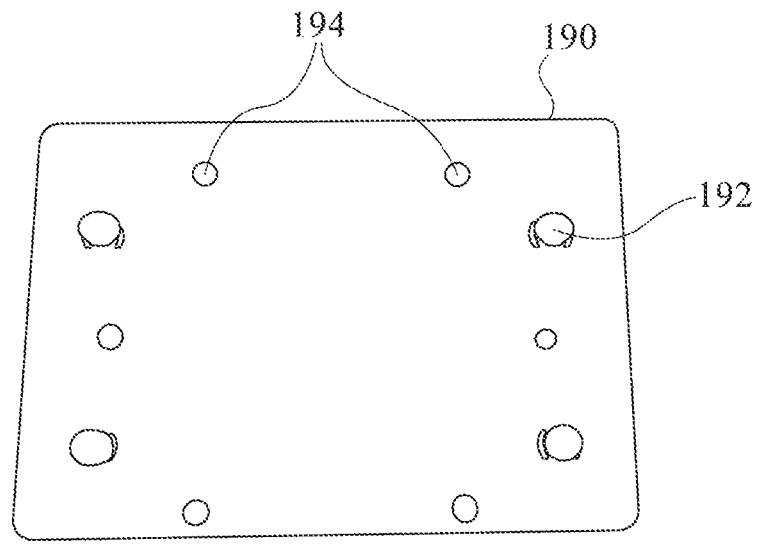
FIG. 15 is a schematic illustration of a back side of a stationary grinding plate, in accordance with embodiments of the present disclosure.

Reference is now made to FIG. 15, which is a schematic illustration of a back side of a stationary grinding plate, in accordance with embodiments of the present disclosure. According to some embodiments, grinding plate 190 may comprise several protrusions on the back side of grinding plate 190. For example, grinding plate 190 may comprise protrusions 192 and protrusions 194. Any number of protrusions 192 and protrusions 194 may be implemented, typically, at least two protruding elements 192 and/or 194 may be implemented as part of grinding plate 190. Protrusions 192 and protrusions 194 may be used to connect cover 178 (FIG. 16) onto grinding plate 190. Cover 178 may comprise connecting means to keep weed grinder 100 in a folded state, as will be described with respect to FIG. 16.

Figure 16:
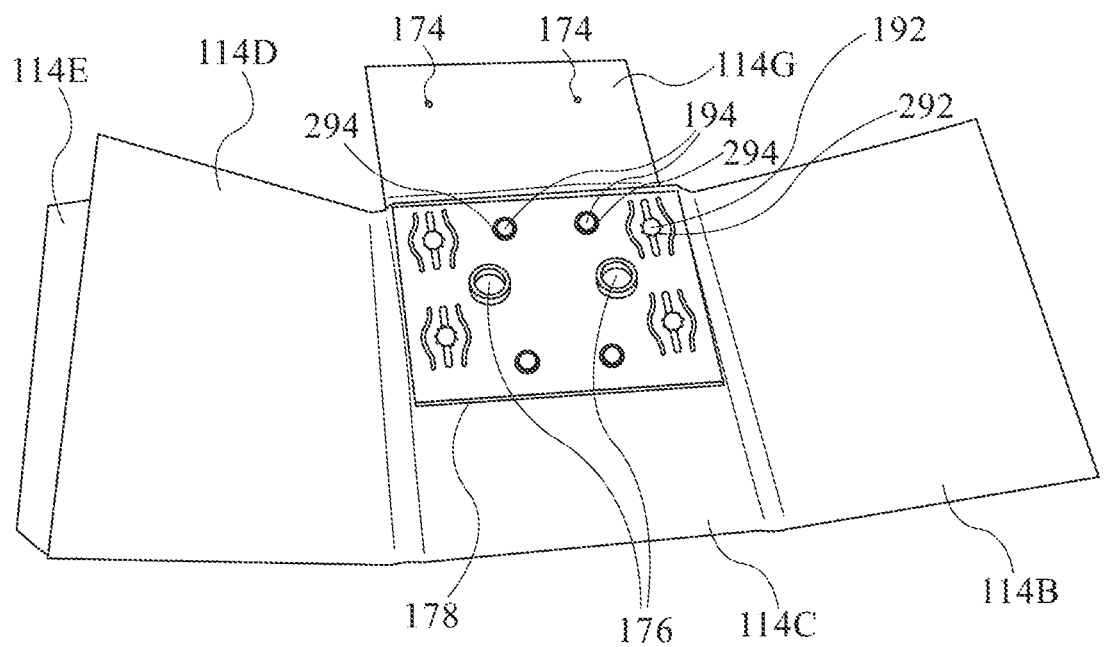
FIG. 16 is a schematic illustration of an upper view of a weed grinder in a semi-folded state, in accordance with embodiments of the present disclosure.

Reference is now made to FIG. 16, which is a schematic illustration of an upper view of a weed grinder in a semi-folded state, in accordance with embodiments of the present disclosure. According to FIG. 13, weed grinder 100 may be folded substantially in half, along folding lines, such that panel 114D may be folded over panel 114E, panel 114C may be folded over panel 114F, and panel 114B may be folded over panel 114A. When weed grinder 100 is folded, e.g., along the middle folding lines, grinding plate 188 may be brought in contact with grinding plate 190.

In order to ensure that weed grinder 100 is kept in folded state, panel 114C may have attached thereon grinding plate 190, on one side, while the other side of panel 114C may comprise cover 178, which may be connected to grinding plate 190. Cover 178 may comprise holes 292 and 294 that may correspond in size and location to protrusions 192 and 194, such that protrusions 192 and 194 may be pressed into holes 292 and 294, respectively, in order to fasten cover 178 onto grinding plate 190 and thus attach grinding pate 190 to panel 114C, via its connection to cover 178. Protrusions 192 and 194 may be of any shape, though typically of a round shape, and holes 292 and 294 may be of a corresponding round shape such to enable ease of connection (e.g., a snap) between grinding plate 190 and cover 178.

In some embodiments, cover 178 may comprise at least one magnetic element that may be in contact with a second magnetic element located on a panel corresponding to panel 114C, and which may be in close proximity to panel 114C. For example, panel 114C may comprise at least one magnetic element 176, and corresponding, panel 114G may comprise at least one corresponding magnetic element 174. When weed grinder 100 is folded to a complete folded state, as illustrated in FIG. 5, the at least one magnetic element 176 located on panel 114C may be positioned in close proximity to the at least one magnetic element 174, which may be located on panel 114G, such that magnetic element 176 attracts magnetic element 174. Although in some embodiments, panels 114A, 114B, 114D and 114E may be positioned in between panel 114C and panel 114G, the magnetic elements 176 and 174 may be powerful enough to attract one another and cause weed grinder 100 to stay in folded state until a user decides to unfold weed grinder 100 and thus overcome the magnetic force between magnetic elements 176 and 174. In other embodiments, magnetic elements may be attached onto other corresponding panels, while keeping weed grinder 100 in folded state.

In some embodiments, magnetic elements 176 and 174 may be magnets of opposite polarization. In other embodiments, at least one magnetic element 176 may be a magnet, while at least one magnetic element 174 may be made of a material that is configured to be attracted to a magnet, e.g., some type of metal, or vice versa. In yet other embodiments, instead of magnetic elements, elements 176 and 174 may be other types of connecting means that may maintain weed grinder in folded state, for example, elements 176 and 174 may be snaps, or press studs.

Figure 17:
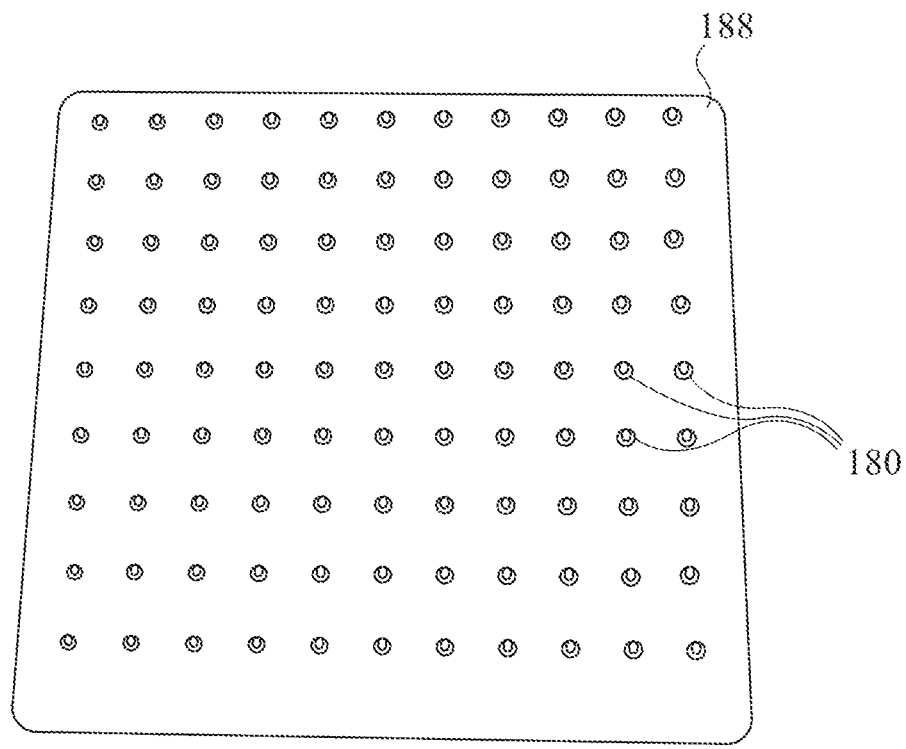
FIG. 17 is a schematic illustration of a front side of a moveable grinding plate, in accordance with embodiments of the present disclosure.

Reference is now made to FIG. 17, which is a schematic illustration of a front side of a moveable grinding plate, in accordance with embodiments of the present disclosure. According to some embodiments, moveable grinding plate 188 may comprise a plurality of protruding elements 180. According to some embodiments, protruding elements 188 may be located substantially along the entire area of grinding plate 188. Protruding elements 180 may be evenly spaced from one another. Protruding elements 180 may be located along the lateral axis as well as along the longitudinal axis of moveable grinding plate 188.

Figure 18:
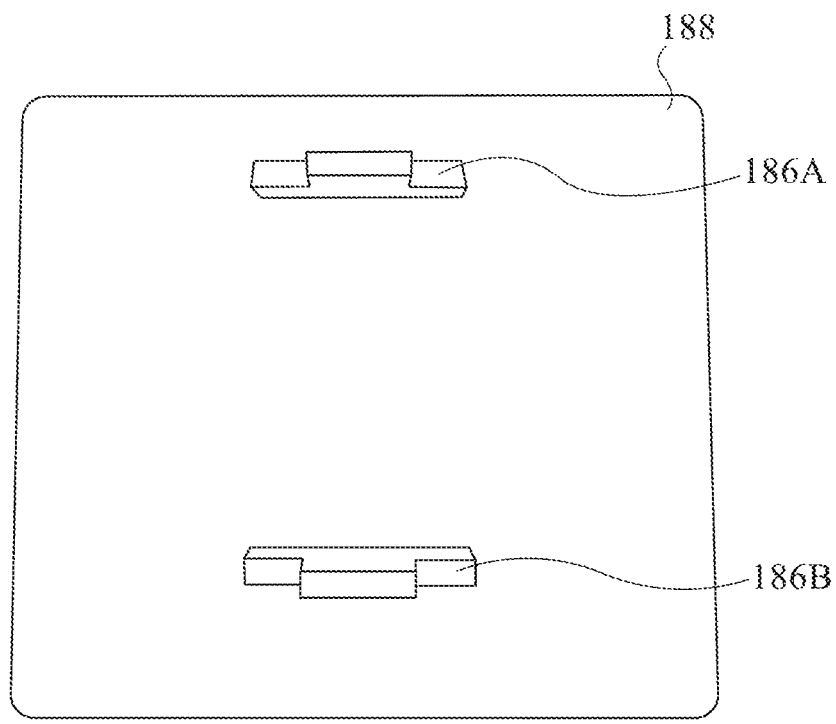
FIG. 18 is a schematic illustration of a back side of a moveable grinding plate, in accordance with embodiments of the present disclosure.

Reference is now made to FIG. 18, which is a schematic illustration of a back side of a moveable grinding plate, in accordance with embodiments of the present disclosure. According to some embodiments, moveable grinding plate 188 may comprise at least one holder or grip, e.g., two holders 186A and 186B, which handle 122 (FIG. 21) may be attached onto. As will be described in detail, with respect to FIG. 21, handle 122 may be connected to holders 186A And 186B (e.g., pressed onto). Thus, movement of handle 122 may cause movement of holders 186A and 186B, which corresponds to movement of moveable grinding plate 188 with respect to stationary grinding plate 190, as part of the grinding process of any substance that is placed in between moveable grinding plate 188 and stationary grinding plate 190. Therefore, holders 186A And 186B are part of the movement of moveable grinding plate 188, and part of the grinding process of substance placed into weed grinder 100.

Figure 19:
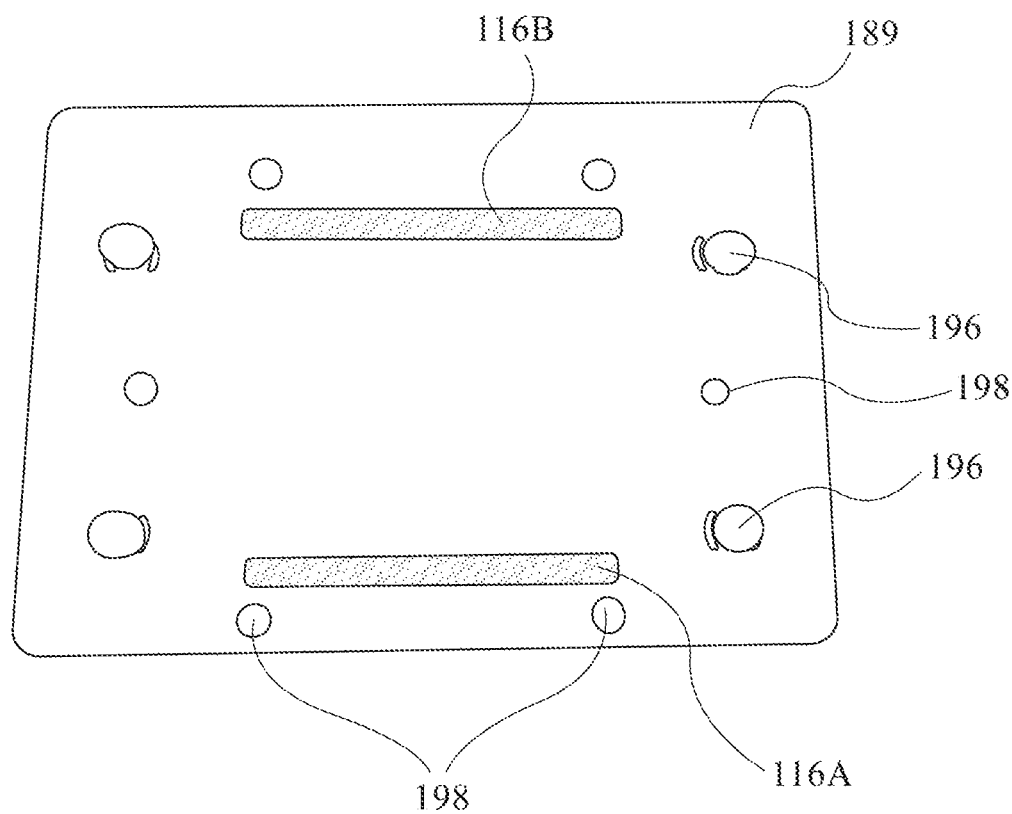
FIG. 19 is a schematic illustration of a back side of a surface onto which a grinding plate moves, in accordance with embodiments of the present disclosure.

Reference is now made to FIG. 19, which is a schematic illustration of a back side of a surface onto which a grinding plate moves, in accordance with embodiments of the present disclosure. According to some embodiments, moveable grinding plate 188 may be moved along surface 189, as illustrated in FIG. 12. In some embodiments, surface 189 may comprise at least one slot or track, e.g., slots or tracks 116A and 116B. According to some embodiments, holders 186A and 186B may be inserted into and moved along tracks 116A and 116B. The length of track 116A may be identical to the length of track 116B. In some embodiments, the length of tracks 116A and 116B may be dictated by the length of moveable grinding plate 188, such that the length of tracks 116a and 116B is shorter than the length of grinding plate 188, as well as shorter than the length of surface 189. In some embodiments, tracks 116A and 116B may be positioned in parallel to one another. Additional tracks may be implemented as part of surface 189, typically located in parallel to one another.

In some embodiments, surface 189 may further comprise protrusions, e.g., protrusions 196 and protrusions 198. Any number of protrusions 196 and/or 198 may be implemented. Protrusions 196 and protrusions 198 may be used to connect surface 189 to a cover 1200 (FIG. 20) from the back side of surface 189, once moveable grinding plate 188 is attached to surface 189 from its front side.

Figure 20:
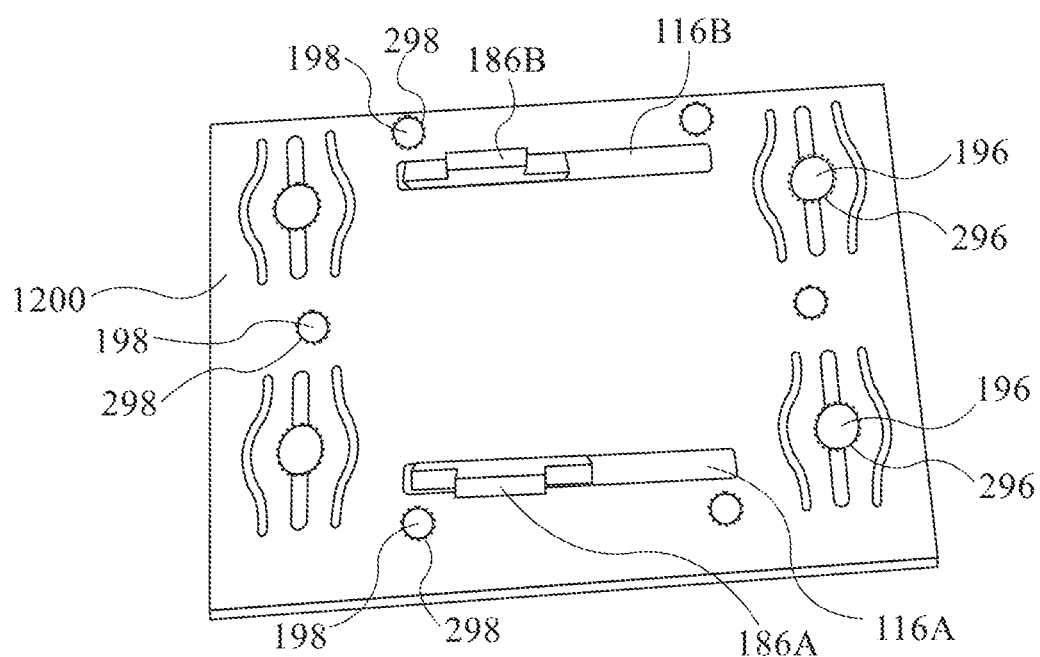
FIG. 20 is a schematic illustration of a back side of an assembly comprising a grinding plate, a surface and a cover, in accordance with embodiments of the present disclosure.

Reference is now made to FIG. 20, which is a schematic illustration of a back side of an assembly comprising a grinding plate, a surface and a cover, in accordance with embodiments of the present disclosure. According to some embodiments, surface 189 may be connected to moveable grinding plate 188 from its front side, and may be connected to cover 1200 from its back side, thus creating an assembly of a moveable grinding plate 188, a surface 189 onto which the grinding plate 188 moves, and a cover 1200 that is configured to connect the moveable grinding plate 188 and the surface 189 to the panels of weed grinder 100.

In some embodiments, cover 1200 may comprise holes, e.g., holes 296 and 298, which may be configured to accept protrusions 196 and 198, respectively, into them. In some embodiments, protrusions 196 and 198 may be pressed or snapped into corresponding holes 296 and 298, respectively. In some embodiments, holes 296 and 298 may correspond in size and location to protrusions 196 and 198, respectively. Typically, the shape of protrusions 196 and 198 is round, thus dictating the shape of holes 296 and 298 being round as well. In other embodiments, protrusions 196 and 198 may be of other shapes besides round, and thus holes 296 and 298 may be of corresponding shapes to those of protrusions 196 and 198.

In some embodiments, holder 186A may be inserted into track 116A, while holder 186B may be inserted into track 116B. Holder 186A may thus move back and forth along track 116A, and holder 186B may move back and forth along track 116B.

In some embodiments, moveable grinding plate 188 and stationary grinding plate 190 may be made of plastic, which is typically cist effective, mainly in mass production. Several types of plastics may be used to manufacture grinding plates 188 and 190, for example, Polyformyl, Acrylonitrile butadiene styrene (ABS), Polypropylene (PP), Polycarbonate (PC), Polyamide (PA), Glass-Filled Polyamide (PA-GF), Polyoxymethylene (POM), Poly(methyl methacrylate) (PMMA), Thermoplastic elastomer (TPE), or any combination thereof.

In some embodiments, the materials from which cover 1200, surface 189, and other parts of weed grinder 100 may be made of may be some type of plastic. For example, cover 1200, surface 189 and other parts of weed grinder 100 may be made of Acrylonitrile butadiene styrene (ABS), Polypropylene (PP), Polycarbonate (PC), Polyamide (PA), Glass-Filled Polyamide (PA-GF), Polyoxymethylene (POM), Poly (methyl methacrylate) (PMMA), Thermoplastic elastomer (TPE), or any combination thereof.

Figure 21:
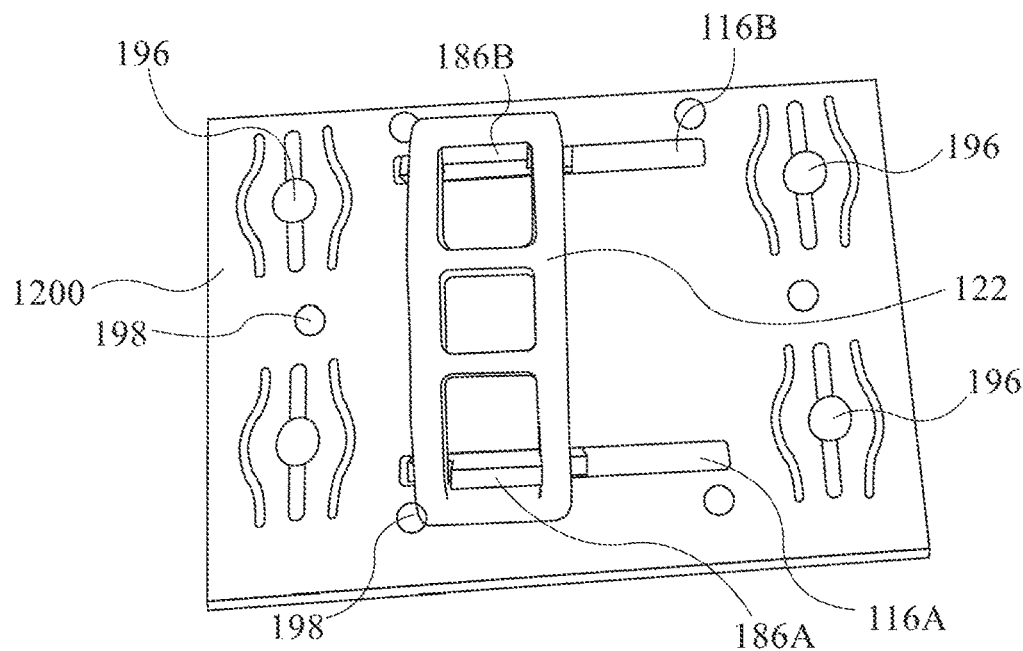
FIG. 21 is a schematic illustration of a back side of the assembly of FIG. 20 including a handle, in accordance with embodiments of the present disclosure.

Reference is now made to FIG. 21, which is a schematic illustration of a back side of the assembly of FIG. 20 including a handle, in accordance with embodiments of the present disclosure. According to some embodiments, handle 122 may be connected to the assembly of FIG. 20, e.g., to the back side of weed grinder 100. Handle 122 may be attached to holders 186A and 186B. In some embodiments, handle 122 may comprise an opening with a width corresponding to the length of at least one holder, e.g., holder 186A and/or holder 186B. Handle 122 may thus snap onto or be pressed onto holders 186A and 186B, in order to provide a good and stable connection between handle 122 and holders 186A and 186B.

In some embodiments, handle 122, may be maneuvered by a user of weed grinder 100 such to move grinding plate 188 along surface 189, with respect to grinding plate 190, and thus cause the grinding process of any substance that may be inserted between grinding plate 188 and grinding plate 190. The type of movement of the moveable grinding plate 188 with respect to stationary grinding plate 190 is typically linear, e.g., along a lateral axis or a longitudinal axis of weed grinder 100.

Figure 22:
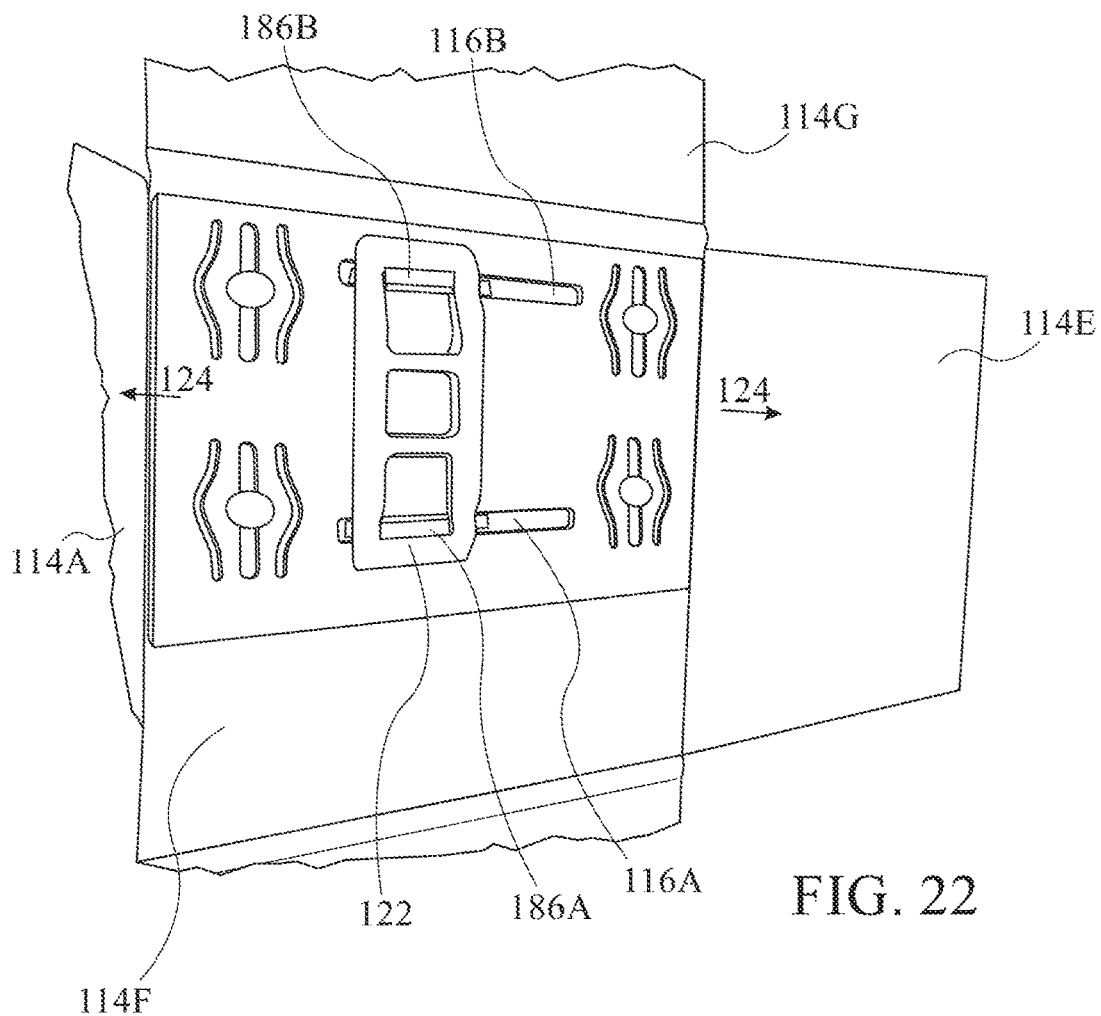
FIG. 22 is a schematic illustration of a back side of some panels of the weed grinder, in accordance with embodiments of the disclosure.

Reference is now made to FIG. 22, which is a schematic illustration of a back side of some panels of the weed grinder, in accordance with embodiments of the disclosure. The back side of weed grinder 100 may comprise handle 122. In some embodiments, handle 122 may be moved back and forth along direction 124, i.e., handle 122 and thus grinding plate 188 may move in linear motion with respect to grinding plate 190.

In some embodiments, handle 122 may move back and forth along at least one track, e.g., either of tracks 116A and 116B. In case weed, grinder 100 comprises more than one track, the tracks may be positioned in parallel to one another, e.g., track 116A may be positioned parallel to track 116B. According to some embodiments, handle 122 may be connected to at least one holder 186A and/or 186B, which may be inserted into the at least one track, e.g., track 116A and/or track 116B, such to properly attach handle 122 through the at least one track to grinding plate 188. Smooth linear motion of the at least one holder 186A and/or 186B along at least one track 116a and/or 116B, may cause smooth linear movement of handle 122 back and forth along the at least one track 116A and/or 116B, due to the connection between handle 122 and the at least one holder 186A and/or 186B.

Typically, two parallel tracks, e.g., track 116A and track 116E may provide a more stable movement of handle 122 along the two tracks. Once a user moves or slides handle 122 along the at least one track, e.g., track 116A and/or track 116B, grinding plate 188 that may be attached to handle 122, may be moved with respect to grinding plate 190 in order to finely grind any substance that may be inserted into weed grinder 100, e.g., weed 170 (FIG. 14).

In some embodiments, handle 122 may be of any shape, as long as it may be easily maneuvered by a user for operating the grinding process. In some embodiments, handle 122 may be made of various materials, typically some kind of plastic material, for example, Acrylonitrile butadiene styrene (ABS), Polypropylene (PP), Polycarbonate (PC), Polyamide (PA), Glass-Filled Polyamide (PA-GF), Polyoxymethylene (POM), Poly(methyl methacrylate) (PMMA), Thermoplastic elastomer (TPE), or any combination thereof. Handle 122 may be made of other materials as well.

Figure 23:
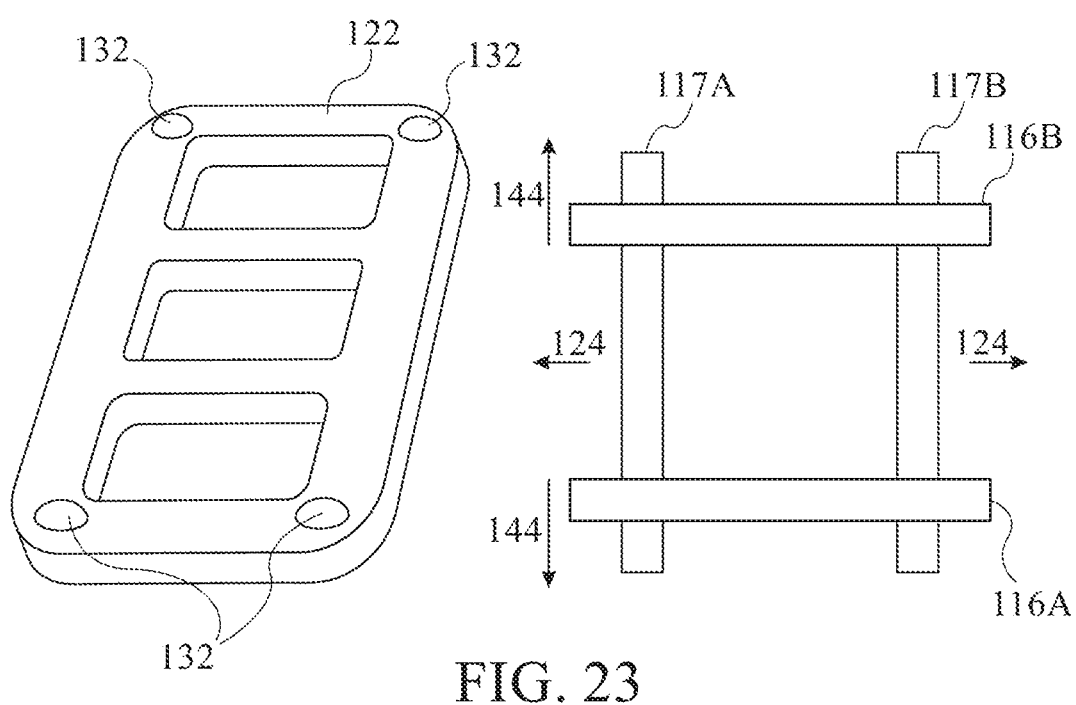
FIG. 23 is a schematic illustration of a front side of a handle and tracks along which the handle may move, in accordance with embodiments of the disclosure.

Reference is now made to FIG. 23, which is a schematic illustration of a backside of a handle and tracks along which the handle may move, in accordance with embodiments of the disclosure. According to some embodiments, instead of being connected to cover 1200 via connection to at least one holder, e.g., holder 186A and/or 186B, handle 122 may comprise at least one protrusion 132, which may be located on the front side of handle 122, which is the side through which handle 122 is connected to cover 1200. In some embodiments, handle 122 may be in the shape of a rectangle, and may comprise more than one protrusion 132, e.g., four protrusions 132, each located at one of the four corners of handle 122. Protrusions 132 may be placed inside the at least one track, e.g., tracks 116A and/or 116B, and may thus be used to enable easy maneuvering of handle 122 along the tracks, and to further enable ease of operation of the grinding process. In addition, protrusions 132 may be used to connect handle 122 to grinding plate 188, e.g., via corresponding niches (not shown) that may be located along grinding plate 188. A proper connection between handle 122 and grinding plate 188 may ensure that movement of handle 122 controls movement of moveable grinding plate 188 with respect to stationary grinding plate 190, which enables operation of the grinding process.

In some embodiments, and as mentioned with respect to FIG. 19, weed grinder 100 may comprise at least one, e.g., two lateral tracks 116A and 116B, which may be located along a lateral axis of weed grinder 100, in order to enable linear motion of grinding plate 188 with respect to grinding plate 190. The distance between lateral tracks 116A and 116B may be dictated by the distance between a pair of holders 186A and 186B (FIG. 22), or by the distance between a pair of protrusions 132, which may be located along the longitudinal axis of weed grinder 100. That is, once handle 122 is connected to tracks 116A and 116B, handle 122 may move or slide along tracks 116A and 116B in linear motion along a lateral axis of weed grinder 100.

In other embodiments, weed grinder 100 may comprise at least one longitudinal track, e.g., two parallel tracks 117A and 117B, which may be located along a longitudinal axis of weed grinder 100. The distance between longitudinal tracks 117A and 117B may be dictated by the distance between a pair of protrusions 132, which may be located along the lateral axis of weed grinder 100. That is, once handle 122 is inserted into tracks 117A and 117B, handle 122 may move or slide along tracks 117A and 117B in linear motion along a longitudinal axis of weed grinder 100.

In yet other embodiments, weed grinder 100 may comprise both lateral and longitudinal tracks, in order to enable linear motion along both the lateral and longitudinal axes, which may enable a quicker grinding process compared to when weed grinder 100 comprises tracks along a single axis, whether it being the lateral axis or the longitudinal axis. A user may move handle 122 along both the longitudinal and the lateral axes. For example, a user may move handle 122 along longitudinal tracks, e.g., longitudinal tracks 117A and 117B, and along lateral tracks, e.g., lateral tracks 116A and 116B, as many times and at any order the user prefers, such to finely grind any substance inserted between linearly moveable grinding plate 188 and stationary grinding plate 190.

Any term that has been defined above and used in the claims, should to be interpreted according to this definition.

The reference numbers in the claims are not a part of the claims, but rather used for facilitating the reading thereof.

These reference numbers should not be interpreted as limiting the claims in any form.

The invention claimed is:

1. A weed grinder, comprising:
    a single board, comprising at least four panels;
    one folding line disposed between two adjacent panels of said at least four panels, for forming a flat cell between said two adjacent panels; and
    two grinding plates, each of the two grinding plates disposed on one of said two adjacent panels which the folding line is disposed therebetween,
wherein at least one of said two grinding plates is movable in linear motion with respect to the other.

2. The weed grinder according to claim 1, wherein size of said weed grinder in folded state conforms to a pocket size.

3. The weed grinder according to claim 1, wherein said weed grinder is configured to form said flat cell for grinding weed, and
    to direct pouring of said ground weed out of said flat cell by gravity, such to avoid use of a mediator element to which ground weed is poured and from which ground weed is poured out.

4. The weed grinder according to claim 1, wherein each of said two grinding plates is smaller than the panel on which each of the two grinding plates is disposed, and
    each of the two grinding plates is disposed away from said folding line disposed between said two of said adjacent panels, thereby forming a non-grindable area on said two adjacent panels between said grinding plates, from which said ground weed is pourable out of said single board.

5. The weed grinder according to claim 1, wherein said at least one moveable grinding plate moves along a smooth surface attached onto at least one of said at least two adjacent panels.

6. The weed grinder according to claim 1, further comprising a handle being accessible from outside said flat cell configured to move said at least one movable grinding plate in linear motion.

7. The weed grinder according to claim 6, wherein said handle is configured to move back and forth along a track.

8. The weed grinder according to claim 6, said weed grinder further comprising:
    at least one lateral track located along a lateral axis of said weed grinder; and
    at least one longitudinal track located along a longitudinal axis of said weed grinder, wherein said handle is configured to move in linear motion along said at least one lateral track and is configured to move in linear motion along said at least one longitudinal track.

9. The weed grinder according to claim 1, wherein each of said two grinding plates comprises protruding elements.

10. The weed grinder according to claim 9, wherein said protruding elements are evenly spaced and located along the lateral and longitudinal axes of each of said two grinding plates.

11. The weed grinder according to claim 1, wherein said single board is made of a non-absorbent material.

12. The weed grinder according to claim 11, wherein said non-absorbent material is paper covered with aluminum foil.

13. The weed grinder according to claim 1, wherein said weed grinder is configured to preserve weed within the weed grinder, before and/or after grinding.

14. The weed grinder according to claim 1, wherein said weed grinder is configured to rub weed between said two grinding plates.

15. The weed grinder according to claim 1, wherein said weed grinder comprises at least two connecting means that cause the weed grinder to stay in folded state.

16. The weed grinder according to claim 15, wherein said at least two connecting means are selected from a group consisting of: a magnet, an element made of a material that is attracted to magnets, a snap, a press stud and any combination thereof.

* * * * *